(12) United States Patent
Wachsman et al.

(10) Patent No.: US 10,044,057 B2
(45) Date of Patent: Aug. 7, 2018

(54) POROUS CERAMIC MOLTEN METAL COMPOSITE SOLID OXIDE FUEL CELL ANODE

(71) Applicant: University of Florida Research Foundation Inc., Gainesville, FL (US)

(72) Inventors: Eric D. Wachsman, Fulton, MD (US); Sean Robert Bishop, Waltham, MA (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 83 days.

(21) Appl. No.: 14/887,909

(22) Filed: Oct. 20, 2015

(65) Prior Publication Data
US 2016/0133979 A1    May 12, 2016

Related U.S. Application Data

(62) Division of application No. 13/416,417, filed on Mar. 9, 2012, now abandoned.
(Continued)

(51) Int. Cl.
*H01M 8/1213* (2016.01)
*H01M 4/90* (2006.01)
(Continued)

(52) U.S. Cl.
CPC ....... *H01M 8/1213* (2013.01); *H01M 4/8621* (2013.01); *H01M 4/8652* (2013.01); *H01M 4/9025* (2013.01); *H01M 4/9066* (2013.01); *H01M 8/126* (2013.01); *H01M 2008/1293* (2013.01); *H01M 2300/0074* (2013.01)

(58) Field of Classification Search
None
See application file for complete search history.

(56) References Cited

U.S. PATENT DOCUMENTS

| | | |
|---|---|---|
| 2004/0202924 A1 | 10/2004 | Tao et al. |
| 2006/0040167 A1 | 2/2006 | Blake et al. |

(Continued)

FOREIGN PATENT DOCUMENTS

WO    WO 2010-045329    4/2010

OTHER PUBLICATIONS

Koslowske, M. et al., "Liquid Tin Anode SOFC JP-8 Start Up," CERDEC, Contract No. W911NF-08-1-0115, Oct. 17, 2008, prepared by CellTech Power.
(Continued)

*Primary Examiner* — Wojciech Haske
(74) *Attorney, Agent, or Firm* — Saliwanchik, Lloyd & Eisenschenk

(57) ABSTRACT

A fuel cell anode comprises a porous ceramic molten metal composite of a metal or metal alloy, for example, tin or a tin alloy, infused in a ceramic where the metal is liquid at the temperatures of an operational solid oxide fuel cell, exhibiting high oxygen ion mobility. The anode can be employed in a SOFC with a thin electrolyte that can be a ceramic of the same or similar composition to that infused with the liquid metal of the porous ceramic molten metal composite anode. The thicknesses of the electrolyte can be reduced to a minimum that allows greater efficiencies of the SOFC thereby constructed.

11 Claims, 3 Drawing Sheets

Related U.S. Application Data

(60) Provisional application No. 61/451,252, filed on Mar. 10, 2011.

(51) Int. Cl.
   H01M 4/86 (2006.01)
   H01M 8/126 (2016.01)
   H01M 8/124 (2016.01)

(56) References Cited

U.S. PATENT DOCUMENTS

| | | |
|---|---|---|
| 2006/0280998 A1 | 12/2006 | Ying et al. |
| 2007/0048555 A1 | 3/2007 | Blake et al. |
| 2007/0166604 A1* | 7/2007 | Katagiri ............... H01M 4/861 429/441 |
| 2009/0305090 A1 | 12/2009 | Chuang |

OTHER PUBLICATIONS

Tao, T. et al., "Direct Logistic Fuel JP-8 Conversion in a Liquid Tin Anode Solid Oxide Fuel Cell (LTA-SOFC)," *DARPA DSO/CERDEC*, Grant No. W911NF-07-C-0032, Apr. 9, 2008, prepared by CellTech Power.

"DOE selects nine SECA projects for core tech," *Fuel Cells Bulletin*, Jul. 2008, p. 9, vol. 2008, No. 7.

"SOFC with liquid tin anodes, Hyper shakedown at NETL," *Fuel Cells Bulletin*, Apr. 2009, p. 11, vol. 2009, No. 4.

Gorte, R.J. et al., "Nanostructured anodes for solid oxide fuel cells," *Current Opinion in Colloid & Interface Science*, 2009, pp. 236-244, vol. 14.

* cited by examiner

POROUS CERAMIC MOLTEN METAL COMPOSITE SOLID OXIDE FUEL CELL ANODE

CROSS-REFERENCE TO RELATED APPLICATION

This application is a divisional of U.S. patent application Ser. No. 13/416,417, filed Mar. 9, 2012, which claims the benefit of U.S. Provisional Application Ser. No. 61/451,252, filed Mar. 10, 2011, the disclosures of which are hereby incorporated by reference herein in their entireties, including any figures, tables, or drawings.

The subject invention was made with government support under The United States Army, Contract No. 2008-ARM079-0001. The government has certain rights to this invention.

BACKGROUND OF THE INVENTION

Fuel cells combine oxygen and fuel to chemically generate electricity without combustion. Solid Oxide Fuel Cells (SOFC's) use ceramic materials as an electrolyte, typically a solid yttria-stabilized zirconium oxide (YSZ), which is an excellent conductor of oxygen ions at high temperatures. SOFC technology has the distinct advantage over competing fuel cell technologies (e.g. molten carbonate, polymer electrolyte, phosphoric acid and alkali) because of its ability to use fuels other than hydrogen and their relative insensitivity to CO, which act as poisons to other fuel cell types, but is a fuel for these cells. The general design of a SOFC is two porous electrodes separated by a ceramic electrolyte. The oxygen source, typically air, contacts the cathode, for example strontium doped lanthanum manganese oxide (LSM), strontium doped lanthanum cobalt iron oxide (LSCF), or other conventional cathode material, to form oxygen ions upon reduction by electrons at the cathode/electrolyte/oxygen triple phase boundary. The oxygen ions diffuse through the electrolyte material to the anode where the oxygen ions encounter the fuel at the anode forming, water, carbon dioxide (with hydrocarbon fuels), heat, and electrons. The electrons transport from the anode through an external circuit to the cathode. A particularly useful anode for many cells is a liquid tin anode.

A Liquid Tin Anode Solid Oxide Fuel Cell (LTA-SOFC) is a fuel cell that combines the efficiency and reliability of conventional SOFCs while expanding the range of fuels that can be used, including gaseous, liquid, and solid fuels, and is particularly tolerant to impurities, such as sulfur. Another advantage is that coking is not a problem due to the low catalytic activity of tin toward carbon depositions and because the tin is a low vapor pressure liquid at use temperatures, for example, above 232° C., such that a stable surface to promote excessive coke formation is not available. Typically the tin is supported on the YSZ electrolyte, which is relatively thick.

Because of the thickness of the electrolyte, available LTA-SOFCs, which are used at temperatures in excess of 1000° C. have power densities that are significantly lower than other state of the art SOFCs, including those designed to function at lower temperatures, see for example International Application Publication No. WO/2010/045329. Hence, a SOFC that combines a molten metal anode with a thin electrolyte to significantly lower the cells resistance is desirable.

BRIEF SUMMARY OF THE INVENTION

Embodiments of the invention are directed to a fuel cell anode comprising a porous ceramic molten metal composite. Other embodiments of the invention are directed to a solid oxide fuel cell (SOFC) that comprises the anode comprising a porous ceramic molten metal composite. The porous ceramic molten metal composite comprises a metal or metal alloy that is infused into a porous ceramic and is liquid at a temperature below the working temperature of the SOFC. The metal or metal alloy comprises tin, bismuth, indium, lead, antimony, copper, molybdenum, mercury, iridium, palladium, rhenium, platinum, silver, arsenic, rhodium, tellurium, selenium, osmium, gold, germanium, thallium, cadmium, gadolinium, chromium, nickel, iron, tungsten, cobalt, zinc, or vanadium and the porous ceramic comprises a doped $CeO_2$ or stabilized $ZrO_2$, such as Gd-doped $CeO_2$ (GDC), Y-doped $CeO_2$ (YDC), Sm-doped cerium oxide (SDC), Sm-Nd-doped cerium oxide, yttria-stabilized zirconia (YSZ), Ca-stabilized zirconia, or Sc-stabilized zirconia.

The solid oxide fuel cell (SOFC) comprises a layer of the anode comprising the porous ceramic molten metal composite, a cathode layer comprising a metal oxide or mixed metal oxide, and an electrolyte layer comprising an oxygen ion conductive ceramic. The cathode can comprise a perovskite-type oxide, such as $LaMnO_3$, $La_{0.84}Sr0._{16}MnO_3$, $La_{0.84}Ca_{0.16}MnO_3$, $La_{0.84}Ba_{0.16}MnO_3$, $La_{0.65}Sr_{0.35}Mn_{0.8}Co_{0.2}O_3$, $La_{0.79}Sr_{0.16}Mn_{0.85}CO_{0.15}O_3$, $La_{0.84}Sr_{0.16}Mn_{0.8}Ni_{0.2}O_3$, $La_{0.84}Sr_{0.16}Mn_{0.8}Fe_{0.2}O_3$, $La_{0.84}Sr_{0.6}Mn_{0.8}Ce_{0.2}O_3$, $La_{0.84}Sr_{0.16}Mn_{0.8}Mg_{0.2}O_3$, $La_{0.84}Sr_{0.16}Mn_{0.8}Cr_{0.2}O_3$, $La_{0.6}Sr_{0.35}Mn_{0.8}Al_{0.2}O_3$, $La_{0.84}Scsub._{0.16}MnO_3$, $La_{0.84}Y_{0.16}MnO_3$, $La_{0.7}Sr_{0.3}CoO_3$, $LaCoO_3$, $La_{0.7}Sr_{0.3}FeO_3$, $La_{0.5}Sr_{0.5}CoO_{0.8}Fe_{0.2}O_3$, or a composite of a perovskite-type oxide and a solid electrolyte, for example, LSCF-GDC or LSM-YSZ. The cathode layer can comprise a metal oxide or mixed metal oxide, for example, $Bi_2Ru_2O_7$ (BRO7), $BRO7-(Er_2O_3)_{0.2}(Bi_2O_3)_{0.8}$ (ESB) composite, $BRO-(Dw_2O_3)_{0.2}(Bi_2O_3)_{0.8}$ (DSB) composite, $BRO-(Y_2O_3)_{0.2}(Bi_2O_3)_{0.8}$ (YSB) composite, or $BRO-Bi_{2-(x+y)}Dy_xW_yO_3$ (DWSB) composite. The electrolyte layer can be GDC ($Ce_xGd_{1-x}O_{2-\delta}$), Y-doped $CeO_2$ (YDC) ($Ce_xY_{1-x}O_{2-\delta}$), Sm-doped cerium oxide (SDC) ($Ce_xSm_{1-x}O_{2-\delta}$), Sm-Nd-doped cerium oxide ($Sm_xNd_yCe_{1-x-y}O_{2-\delta}$); yttria-stabilized zirconia (YSZ); Ca-stabilized zirconia; or Sc-stabilized zirconia. The electrolyte layer can be the same oxygen ion conductive ceramic included in the porous ceramic molten metal composite of the anode layer. The electrolyte layer can be a bilayer electrolyte comprising a layer of the same oxygen ion conductive ceramic included in the anode layer and a layer of the metal oxide or mixed metal oxide of the cathode layer.

DETAILED DESCRIPTION OF THE INVENTION

Figure 1:
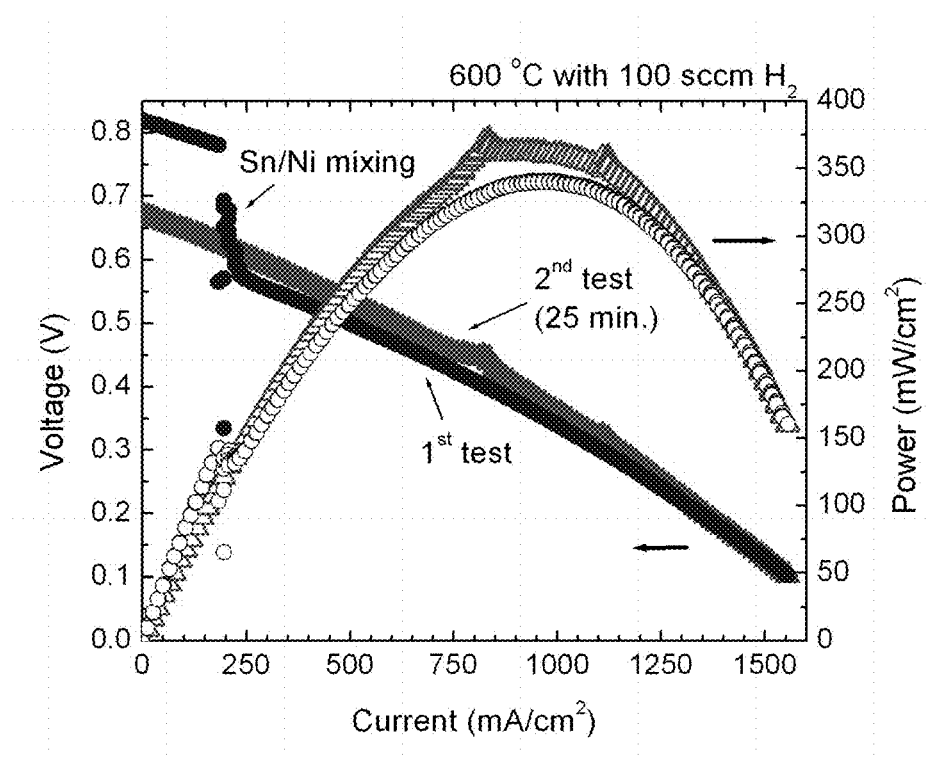
FIG. 1 shows an SEM image of a Sn/GDC composite anode, according to an embodiment of the invention, where Sn (dark grey) is intimately mixed with GDC (light grey) and surrounded by continuous porosity (black) for good fuel gas transport and oxidation, where each edge of the micrograph is approximately 50 μm.

Embodiments of the invention are directed to solid oxide fuel cells (SOFCs) that employ a porous ceramic molten metal composite anode with a cathode, an electrolyte in contact with the anode and the cathode, and an electrical circuit connecting the anode and the cathode for use of the electrical power resulting from the chemical reaction generated by the oxidation of the fuel. The oxidant, generally oxygen from the air is exposed to the cathode where it is reduced with the consumption of electrons to oxygen ions that transports through the electrolyte to the anode. Simultaneously, fuel is supplied to the anode where it reacts with the oxygen ion to form electrons and oxidation products, such as water where the fuel is hydrogen, water and carbon dioxide when the fuel is a hydrocarbon, or carbon dioxide when the fuel is carbonaceous, with release of electrons as the fuel is oxidized. The electrons generated at the anode are transmitted through the electrical circuit to the cathode.

Embodiments of the invention are directed to the porous ceramic molten metal composite anodes for use in SOFCs. The porous ceramic, for example Gd-doped $CeO_2$ (GDC), not only supports the molten metal, for example tin, but acts in a complementary fashion to the molten metal as it facilitates oxygen diffusion into the anode from the electrolyte and within the anode to an extent that is not possible in the liquid metal alone due to the low solubility of oxygen ion in the metal, particularly those of metal oxides that are formed where the fuel cell is operated below the melting temperature of the metal oxide, when the metal is prone to formation of an insulating metal oxide at the electrolyte interface.

A significant proportion of the fuel oxidation occurs at the triple phase boundary of the GDC/metal/fuel in the porous ceramic molten metal composite anode. The high electron conductivity of the molten metal and the high oxygen ion conductivity of the porous ceramic combine in a complementary fashion. As the anode is a composite that provides a relatively large triple phase boundary, it differs from a molten metal anode of a fuel cell that uses a porous ceramic only as the electrolyte or as a facilitating component that separates or controls the contacting of fuel to the separate molten metal anode. The composite structure is constructed to optimize the area of the triple phase boundary of the oxygen conductive ceramic, the molten metal and the fuel. The porous ceramic does not function as a barrier between the fuel and the anode, and allows the ceramic in conjunction with the liquid metal to display good electron transport as well as oxygen ion transport. The porous ceramic used in the composite, according to embodiments of the invention, can also provide a high electrical conductivity. Furthermore, the use of the porous ceramic molten metal composite anode allows use of thin electrolytes in the solid oxide fuel cell (SOFC), which decreases the overall cell resistance and promotes superior cell performance. In one embodiment of the invention, the electrolyte and the porous ceramic of the porous ceramic molten metal composite anode can be of the same material composition, which also reduces the cell's resistance.

In embodiments of the invention, the porous ceramic used in the porous ceramic molten metal composite anode can be a doped ceria, (such as Gd-doped $CeO_2$ (GDC) ($Ce_xGd_{1-x}O_{2-\delta}$), Y-doped $CeO_2$ (YDC) ($Ce_xY_{1-x}O_{2-\delta}$), Sm-doped cerium oxide (SDC) ($Ce_xSm_{1-x}O_{2-\delta}$), or Sm-Nd-doped cerium oxide ($Sm_xNd_yCe_{1-x-y}O_{2-\delta}$) a metal-stabilized zirconia (such as yttria-stabilized zirconia (YSZ), Ca-stabilized zirconia, or Sc-stabilized zirconia (SSZ)), or any other ceramic that can transport oxygen anions at high temperatures. Values for x or x+y for these porous ceramics can range from less than 0.1 to about 0.5 and y can range from 0.01 to 0.49 where optimal conductivities are observed. In an embodiment of the invention, the dopant level is 10-20 atom percent of the metal.

In embodiments of the invention, the molten metal of the porous ceramic molten metal composite anodes can be a pure liquid or can have solid and liquid components as long as the overall properties of the metal are liquid-like at the working temperature of the SOFC. The anode can be a pure metal or can comprise an alloy of two or more metals. In one embodiment of the invention, the molten metal can display a standard reduction potential greater than –0.70 V versus the Standard Hydrogen Electrode, as determined at room temperature. The molten metal anode can comprise one or more transition metals, main group metals, alkaline metals, alkaline earth metals, lanthanides, actinides, or any combinations thereof. However, in many embodiments of the invention, the metal although liquid, possesses a low vapor pressure at the working temperature of the SOFC. Metals that can be included as the pure metal or a component of the alloy include tin, bismuth, indium, lead, antimony, copper, molybdenum, mercury, iridium, palladium, rhenium, platinum, silver, arsenic, rhodium, tellurium, selenium, osmium, gold, germanium, thallium, cadmium, gadolinium, chromium, nickel, iron, tungsten, cobalt, zinc, or vanadium. For example, Sn (M.P. 232° C.), Cd (M.P. 321° C.), Zn (M.P. 420° C.), Pb (M.P. 327° C.), Hg (M.P. –39° C.), Se (M.P. 221° C.), Tl (M.P. 304° C.), In (M.P. 156° C.), Bi (M.P. 271° C.), Sb (M.P. 630° C.), and Te (M.P. 450° C.) can be used as the single component or the major components of an alloy matched to an operating temperature above each metal's or alloy's melting point. Alloys include, but are not limited to, those with a primary metal that is included at levels from 50 to 99% by weight. In embodiments of the invention, the porous ceramic molten metal composite anode can be porous GDC with tin, or a liquid tin alloy, such as Sn-Ni, that can be used with hydrocarbon fuels at temperatures as low as 600° C.

The SOFC can be designed to operate where the metal of the porous ceramic molten metal composite anode displays liquid or liquid-like properties at temperature of less than about 1,200° C., at a temperature less than about 1,000° C., at a temperature less than about 900° C., at a temperature less than about 800° C., at a temperature less than about 700° C., or at a temperature less than about 600° C. Those of ordinary skill in the art can appreciate compositions for an anode or how to identify compositions for an anode where temperatures that display liquid or liquid-like behavior is achieved at a desired temperature range, for example from about 300° C. to about 1200° C., from about 500° C. to about 1100° C., from about 500° C. to about 1000° C. from about 500° C. to about 800° C., from about 600° C. to about 1000° C. from about 600° C. to about 900° C., from about 600° C. to about 800° C., from about 600° C. to about 700° C., from about 700° C. to about 1000° C. or from about 800° C. to about 1000° C. For example, Sn can be used at temperatures above 300° C. whereas Sb requires temperatures above 630° C. By addition of approximately 30 atom % Zn to Sb, the melting temperature is suppressed to ~500° C. which allows operation at this temperature. Near 30 atom % (+/−5) Zn, the alloy consists of a small amount of solid phase within a large liquid phase at temperatures above ~500° C. and displays liquid like behavior, allowing its use in an anode, according to an embodiment of the invention. Higher levels of Zn in the alloy with Sb result in a higher alloy melting temperature. The porous ceramic molten metal composite anode resists coking when the metal, for example, tin, displays a low catalytic activity in addition to the presence of the liquid surface that does not stabilize carbon deposition. It is also advantageous when the metal is tolerant of impurities in the fuel. For example, liquid tin resists the blocking of fuel oxidation reaction sites by sulfur and sulfur comprising compounds and does not have promoted metal migration deficiencies that are common with typical non-liquid SOFC anodes.

The shape of the porous ceramic molten metal composite anode, the electrolyte sharing a common interface, and the cathode can vary as is desired to optimize any parameter for the SOFC including: overall volume; surface area of any interface between the various functional layers of the SOFC; effective surface area between the oxidizer and cathode; effective surface area between the fuel and anode; or any other parameters that can facilitate or optimize heat exchange, fluid flows, or mixing, in a manner that can be appreciated by those of ordinary skill in the art. For example, the SOFC can comprise a stack of flat plates or concentric cylinders.

The SOFCs, according to embodiments of the invention, can be constructed to employ fuels that are gases, such as hydrogen, methane, or natural gas, liquids, such as hydrocarbons, or solids. The cells can be designed to introduce the fuel to the anode, and the oxidizer, for example, air, to the cathode in an efficient manner, as have been engineered for many state of the art SOFCs with parallel plate, tubular, or other designs.

The cathode can be a perovskite-type oxide having a general structure of $ABO_3$, where "A" and "B" represent two cation sites in a cubic crystal lattice. For example, the perovskite-type oxide can have the structure $La_xA_aB_bC_cO_d$ where A is an alkaline earth metal, B is selected from the group consisting of scandium, yttrium and a lanthanide metal, C is selected from the group consisting of titanium, vanadium, chromium, iron, cobalt, nickel, copper, zinc, zirconium, hafnium, aluminum and antimony, x is from 0 to about 1.05, y is from 0 to about 1, a is from 0 to about 0.5, b is from 0 to about 0.5, c is from 0 to about 0.5, d is between about 1 and about 5, and at least one of x, y, a, b and c is greater than zero. Examples of perovskite-type oxides include $LaMnO_3$, $La_{0.84}Sr0._{16}MnO_3$, $La_{0.84}Ca_{0.16}MnO_3$, $La_{0.84}Ba_{0.16}MnO_3$, $La_{0.65}Sr_{0.35}Mn_{0.8}Co_{0.2}O_3$, $La_{0.79}Sr_{0.16}Mn_{0.85}CO_{0.15}O_3$, $La_{0.84}Sr_{0.16}Mn_{0.8}Ni_{0.2}O_3$, $La_{0.84}Sr_{0.16}Mn_{0.8}Fe_{0.2}O_3$, $La_{0.84}Sr_{0.6}Mn_{0.8}Ce_{0.2}O_3$, $La_{0.84}Sr_{0.16}Mn_{0.8}Mg_{0.2}O_3$, $La_{0.84}Sr_{0.16}Mn_{0.8}Cr_{0.2}O_3$, $La_{0.6}Sr_{0.35}Mn_{0.8}Al_{0.2}O_3$, $La_{0.84}Scsub._{0.16}MnO_3$, $La_{0.84}Y_{0.16}MnO_3$, $La_{0.7}Sr_{0.3}CoO_3$, $LaCoO_3$, $La_{0.7}Sr_{0.3}FeO_3$, $La_{0.5}Sr_{0.5}CoO_{0.8}Fe_{0.2}O_3$, or a composite of a perovskite-type oxide and a solid electrolyte, for example, LSCF-GDC or LSM-YSZ. The ceramic of the cathode may include other elements, such as titanium, tin, indium, aluminum, zirconium, iron, cobalt, manganese, strontium, calcium, magnesium, barium, or beryllium. Other cathodes that can be used in the SOFCs with the porous ceramic molten metal composite anodes include $LaCoO_3$, $LaFeO_3$, $LaCrO_3$, and a $LaMnO_3$-based perovskite oxide cathode, such as $La_{0.75}Sr_{0.25}CrO_3$, $(La_{0.6}Sr_{0.4})_{0.9}CrO_3$, $La_{0.6}Sr_{0.4}FeO_3$, $La_{0.6}Sr_{0.4}CoO_3$ or $Ln_{0.6}Sr_{0.4}CoO_3$, where the lanthanide may be any one of La, Pr, Nd, Sm, or Gd. The cathode of the SOFC can be a metal oxide or a mixed metal oxide, including $Bi_2Ru_2O_7$ (BRO7), $BRO7-(Er_2O_3)_{0.2}(Bi_2O_3)_{0.8}$ (ESB) composite, $BRO-(Dw_2O_3)_{0.2}(Bi_2O_3)_{0.8}$ (DSB) composite, $BRO-(Y_2O_3)_{0.2}(Bi_2O_3)_{0.8}$ (YSB) composite, or $BRO-Bi_{2-(x+y)}Dy_xW_yO_3$ (DWSB) composite. Alternatively, the cathode may include a metal. Examples of metals useful for the cathodes include platinum, palladium, gold, silver, rhodium, rhenium, iridium, osmium, and any combination thereof.

The electrolyte can be doped ceria (such as Gd-doped $CeO_2$ (GDC) ($Ce_xGd_{1-x}O_{2-\delta}$), Y-doped $CeO_2$ (YDC) ($Ce_xY_{1-x}O_{2-\delta}$), Sm-doped cerium oxide (SDC) ($Ce_xSm_{1-x}O_{2-\delta}$), or Sm-Nd-doped cerium oxide ($Sm_xNd_yCe_{1-x-y}O_{2-\delta}$)), or metal-stabilized zirconia (such as yttria-stabilized zirconia (YSZ), Ca-stabilized zirconia, or Sc-stabilized zirconia (SSZ)). In some embodiments of the invention, the electrolyte is of the same composition of the porous ceramic include in the porous ceramic molten metal composite anode. In some embodiments of the invention, the electrolyte can be a bilayer electrolyte structured to complement both the anode and cathode structures, for example a bilayer electrolyte can be $Ce_xSm_{1-x}O_{2-\delta}$ (SDC), $Ce_xGd_{1-x}O_{2-\delta}$ (GDC), or $Sm_xNd_yCe_{1-x-y}O_{2-\delta}$ with a bismuth oxide comprising layer of $Bi_{2-x}Er_xO_3$ (ESB), $Bi_{2-x}Dw_xO_3$ (DSB), $Bi_{2-x}Y_xO_3$ (YSB), or $Bi_{2-(x+y)}Dy_{x-}W_yO_3$ (DWSB), where the values of x or x+y can range from less than 0.1 to about 0.5 and y can range from 0.01 to 0.49, where the cathode is a bismuth comprising cathode, such as BRO7, ESB, DSB, YSB, or DWSB.

MATERIALS AND METHODS

A SOFC was prepared with a porous ceramic molten metal composite anode, where a Sn-Ni/GDC composite anode, as illustrated in FIG. 1, a GDC electrolyte, and a LSCF/GDC composite cathode are combined. The SOFC cell was prepared by partially sintering a mixture of NiO/10GDC ($Gd_{0.1}Ce_{0.9}O_{1.95}$) into a pellet approximately 0.5 mm thick by 2.5 cm in diameter. An aqueous suspension of 10GDC was applied on one side of the pellet, forming a layer of GDC after drying. The pellet was subsequently sintered to make a dense electrolyte of approximately 10 μm in thickness. A mixture of LSCF6428 ($La_{0.6}Sr_{0.4}Co_{0.2}Fe_{0.8}O_{3-\delta}$)/10GDC powders in a paste form with an organic solvent was applied to the 10GDC electrolyte layer, dried, and partially sintered to form a porous composite cathode of approximately 40 μm in thickness. Finally, a piece of tin metal was fixed to the anode cell side using an organic adhesive. The SOFC was used to generate power using hydrogen and dodecane as the fuel.

The SOFCs were tested under the following conditions. Air was applied to the cathode side of the cell. The cell was heated to 600° C. with wet $H_2$ on the anode side. During heating, NiO reduces to Ni and Sn melts to form an alloy with the Ni metal, resulting in the porous Sn-Ni/GDC anode. Currents were measured at a given voltage. After testing in wet $H_2$, vaporized dodecane was introduced to the anode side and current-voltage measurements were performed.

Figure 2:
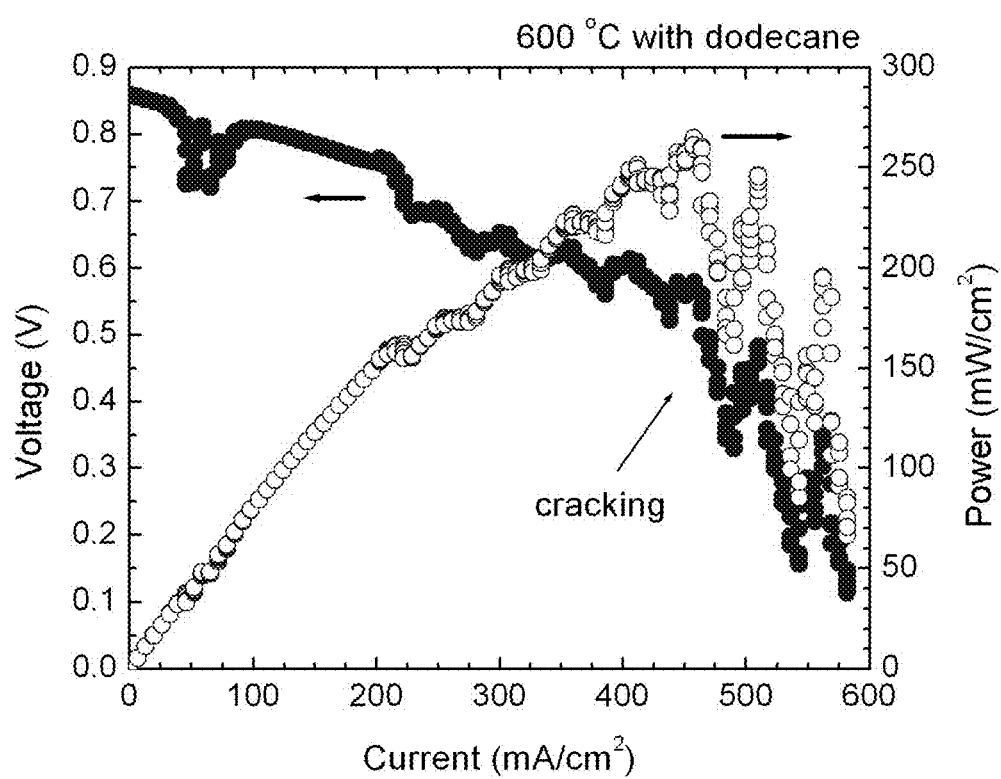
FIG. 2 plots the IV characteristics of a SOFC at 600° C. for a Sn-Ni/GDC anode, a GDC electrolyte, and an LSCF/GDC composite cathode, according to embodiments of the invention, where the data was collected at 600° C. using flowing air at the cathode and wet hydrogen on the anode.
Figure 3:
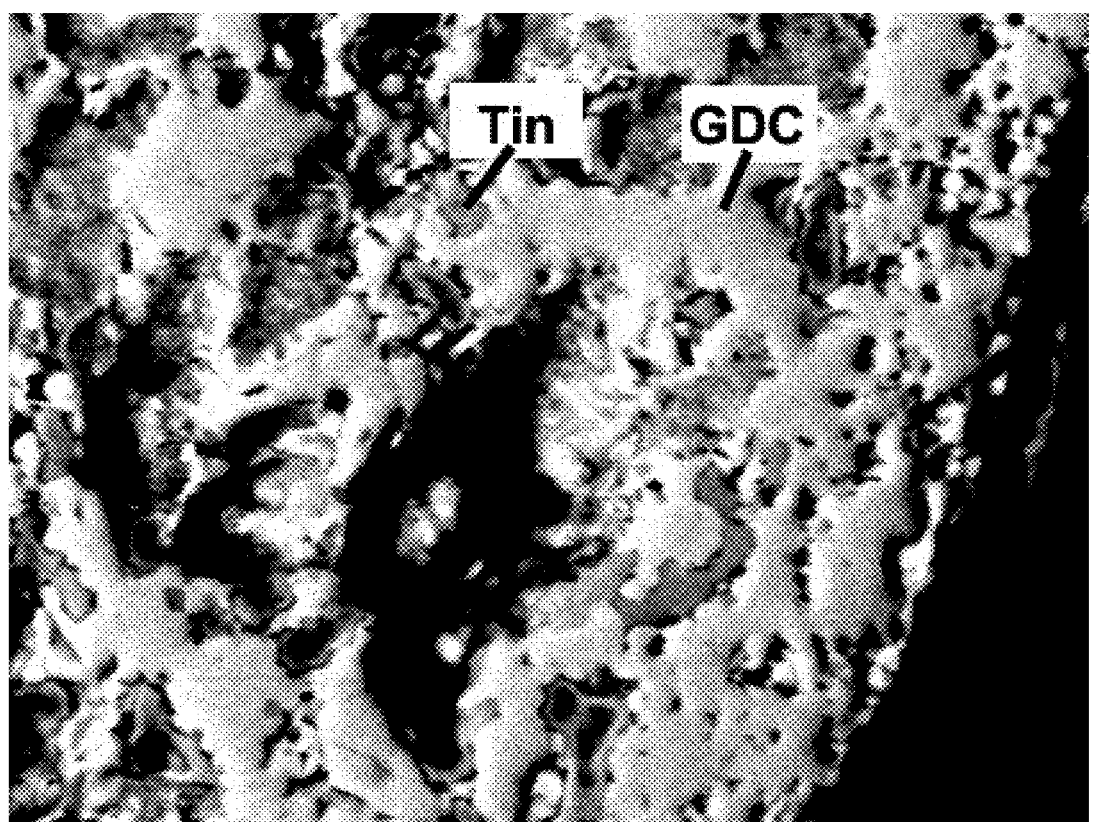
FIG. 3 plots the IV characteristics of a SOFC at 600° C. for a Sn-Ni/GDC composite anode, a GDC electrolyte, and an LSCF/GDC composite cathode, according to embodiments of the invention, where the data was collected at 600° C. using vaporized flowing dodecane at the anode and air at the cathode.

As can be seen in FIG. 2, the SOFC using hydrogen with 3% water at the fuel at 600° C. where the open circuit potential (OCP) is 0.68 V exhibits a maximum power density of 0.35 $Wcm^{-2}$ at 600° C. Using vaporized dodecane at 600° C., as can be seen in FIG. 3, the SOFC displays an OCP of 0.86 V and a maximum power density of 0.25 $Wcm^{-2}$, although some cell instability was apparent. The power densities are representative of a good performing SOFC at 600° C. using wet $H_2$ as fuel, and this power density is also extended to operation using a hydrocarbon fuel such as dodecane, which is very high at 600° C., representing a significant advance in the use of SOFCs for hydrocarbon fuel operation at an intermediate temperature, such as ~600° C.

It should be understood that the examples and embodiments described herein are for illustrative purposes only and that various modifications or changes in light thereof will be suggested to persons skilled in the art and are to be included within the spirit and purview of this application.

We claim:

1. A solid oxide fuel cell (SOFC) with operational temperatures of at least 600° C., comprising:
    an anode layer comprising a porous ceramic molten metal composite wherein a nickel alloy is infused into a porous ceramic, wherein the nickel alloy is 50 to 99 weight percent tin, bismuth, indium, lead, mercury, thallium, zinc, or any combination thereof wherein the nickel alloy is a liquid at 500° C., and wherein the porous ceramic is formed from a NiO/doped ceria, wherein the nickel alloy resides within the pores of the doped ceria formed from the NiO of the NiO/doped ceria;
    a cathode layer comprising a metal oxide or mixed metal oxide; and
    an electrolyte layer comprising an oxygen ion conductive ceria.

2. The SOFC of claim 1, the doped ceria comprises Gd-doped $CeO_2$ (GDC) ($Ce_xGd_{1-x}O_{2-\delta}$), Y-doped $CeO_2$ (YDC)($Ce_xY_{1-x}O_{2-\delta}$), Sm-doped cerium oxide(SDC) ($Ce_xSm_{1-x}O_{2-\delta}$), or Sm-Nd-doped cerium oxide ($Sm_xNd_yCe_{1-x-y}O_{2-\delta}$).

3. The SOFC of claim 1, wherein the nickel alloy comprises tin.

4. The SOFC of claim 1, wherein the metal oxide or mixed metal oxide comprises a perovskite-type oxide.

5. The SOFC of claim 4, wherein the perovskite-type oxide comprises $LaMnO_3$, $La_{0.84}Sr_{0.16}MnO_3$, $La_{0.84}Ca_{0.16}MnO_3$, $La_{0.84}Ba_{0.16}MnO_3$, $La_{0.65}Sr_{0.35}Mn_{0.8}Co_{0.2}O_3$, $La_{0.79}Sr_{0.16}Mn_{0.85}CO_{0.15}O_3 La_{0.84}Sr_{0.16}Mn_{0.8}Ni_{0.2}O_3$, $La_{0.84}Sr_{0.16}Mn_{0.8}Fe_{0.2}O_3$, $La_{0.84}Sr_{0.6}Mn_{0.8}Ce_{0.2}O_3$, $La_{0.84}Sr_{0.16}Mn_{0.8}Mg_{0.2}O_3$, $La_{0.84}Sr_{0.16}Mn_{0.8}Cr_{0.2}O_3$, $La_{0.6}Sr_{0.35}Mn_{0.8}Al_{0.2}O_3$, $La_{0.84}Sc_{sub.0.16}MnO_3$, $La_{0.84}Y_{0.16}MnO_3$, $La_{0.7}Sr_{0.3}CoO_3$, $LaCoO_3$, $La_{0.7}Sr_{0.3}FeO_3$, or $La_{0.5}Sr_{0.5}CoO_{0.8}Fe_{0.2}O_3$.

6. The SOFC of claim 4, wherein the perovskite-type oxide resides in a composite of the perovskite-type oxide and a solid electrolyte metal oxide or mixed metal oxide.

7. The SOFC of claim 6, wherein the composite comprises strontium doped lanthanum cobalt iron oxide-Gd-doped $CeO_2$ (LSCF-GDC) or strontium doped lanthanum manganese oxide-Gd-doped $CeO_2$ (LSM-YSZ).

8. The SOFC of claim 1, wherein the metal oxide or mixed metal oxide comprises $Bi_2Ru_2O_7$ (BRO7), BRO7-$(Er_2O_3)_{0.2}(Bi_2O_3)_{0.8}$ (ESB) composite, BRO-$(Dw_2O_3)_{0.2}(Bi_2O_3)_{0.8}$(DSB) composite, BRO-$(Y_2O_3)_{0.2}(Bi_2O_3)_{0.8}$ (YSB)composite, or BRO-$Bi_{2-(x+y)}Dy_xW_yO_3$ (DWSB) composite.

9. The SOFC of claim 1, wherein the electrolyte layer comprises Gd-doped $CeO_2$ (GDC), Y-doped $CeO_2$ (YDC), Sm-doped cerium oxide (SDC), or Sm-Nd-doped cerium oxide.

10. The SOFC of claim 1, wherein the electrolyte layer comprises the doped ceria of the porous ceramic molten metal composite of the anode layer.

11. The SOFC of claim 1, wherein the electrolyte layer comprises a bilayer electrolyte comprising a layer of the doped ceria of the porous ceramic molten metal composite of the anode layer and a layer of the metal oxide or mixed metal oxide of the cathode layer.

* * * * *

UNITED STATES PATENT AND TRADEMARK OFFICE
CERTIFICATE OF CORRECTION

PATENT NO. : 10,044,057 B2
APPLICATION NO. : 14/887909
DATED : August 7, 2018
INVENTOR(S) : Eric D. Wachsman and Sean Robert Bishop It is certified that error appears in the above-identified patent and that said Letters Patent is hereby corrected as shown below:

In the Specification

Column 2,
Line 60, "the IV" should read --the I–V--.
Line 65, "the IV" should read --the I–V--.

Column 4,
Line 3, "$(Sm_xNd_yCe_{1-x-y}O_{2-\delta})$ a" should read --$(Sm_xNd_yCe_{1-x-y}O_{2-\delta}))$, a--.
Line 48, "at temperature" should read --at a temperature--.

Column 6,
Line 18, "include in" should read --included in--.

In the Claims

Column 8,
Line 5, "$La_{0.79}Sr_{0.16}Mn_{0.85}Co_{0.15}O_3La_{0.84}Sr_{0.16}Mn_{0.8}Ni_{0.2}O_3$" should read --$La_{0.79}Sr_{0.16}Mn_{0.85}Co_{0.15}O_3, La_{0.84}Sr_{0.16}Mn_{0.8}Ni_{0.2}O_3$--.
Line 20, "$BRO-(Dw_2O_3)_{0.2}$" should read --$BRO-(Dw_2O_3)_{0.2}$--.
Line 22, "(YSB)composite" should read --(YSB) composite--.

Signed and Sealed this
Second Day of October, 2018

Andrei Iancu
*Director of the United States Patent and Trademark Office*